United States Patent [19]

Ando et al.

[11] Patent Number: 4,692,779

[45] Date of Patent: Sep. 8, 1987

[54] IMAGE FORMING METHOD AND APPARATUS THEREFOR

[75] Inventors: Yujiro Ando, Yokohama; Shuzo Kaneko, Tokyo, both of Japan

[73] Assignee: Canon Kabushiki Kaisha, Tokyo, Japan

[21] Appl. No.: 683,862

[22] Filed: Dec. 20, 1984

[30] Foreign Application Priority Data

Jan. 6, 1984 [JP] Japan .................................. 59-000598

[51] Int. Cl.⁴ ...................... G01D 15/06; G01D 9/42; G02F 1/13

[52] U.S. Cl. ................. 346/153.1; 346/108; 346/160; 350/330

[58] Field of Search ........... 346/153.1, 17, 107, 346/108, 76 R, 160; 350/330, 350 S, 338, 346

[56] References Cited

U.S. PATENT DOCUMENTS 4,267,556  5/1981  Fotland et al. ................. 346/153.1
4,345,258  8/1982  Tsai et al. ........................ 346/17
4,367,924  1/1983  Clark et al. ................... 350/346 X
4,525,032  6/1986  Hilsum ......................... 350/330 X Primary Examiner—E. A. Goldberg
Assistant Examiner—Linda M. Peco
Attorney, Agent, or Firm—Fitzpatrick, Cella, Harper & Scinto

[57] ABSTRACT

A liquid crystal, particularly a ferroelectric liquid crystal, is interposed between an electroconductive member and an electric charge accepting member to form a liquid crystal device. In the first step of image formation, a uniform polarity of charge is imparted to the entirety or a part of the electric charge accepting member whereby the liquid crystal is uniformly oriented to its first stable state under a uniform electric field thus formed therethrough. In the second step, the reverse polarity of charges are given imagewise to the charge accepting member, whereby the liquid crystal is reoriented imagewise to the second stable state to form an image.

68 Claims, 8 Drawing Figures

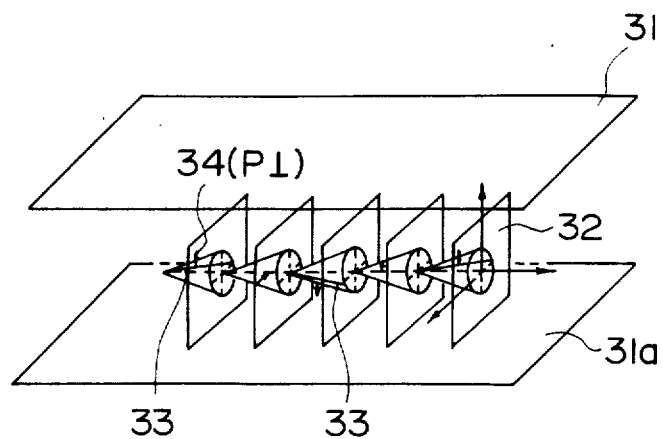
F I G. 3
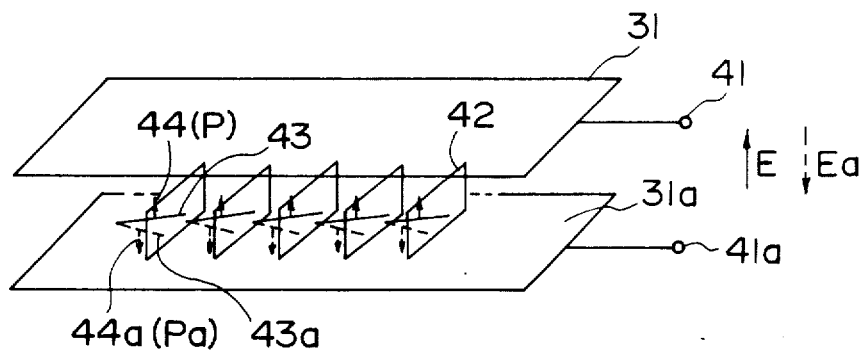
F I G. 4

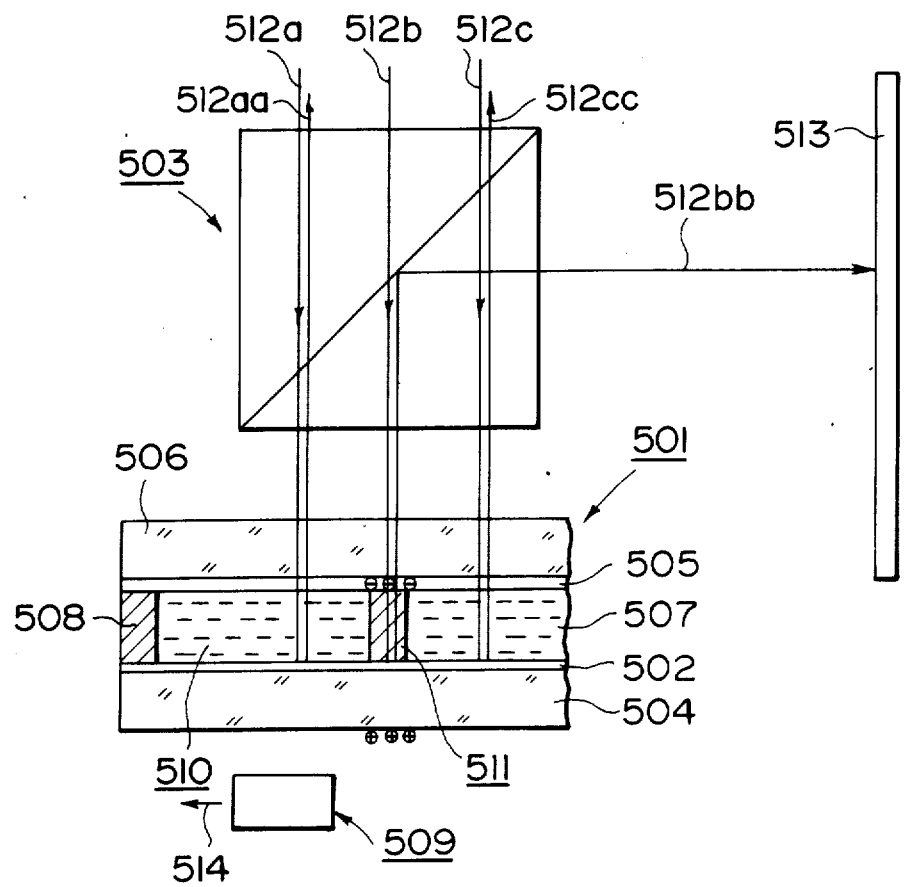
F I G. 5A
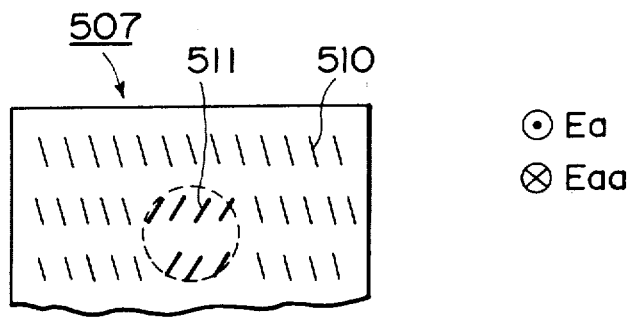
F I G. 5B

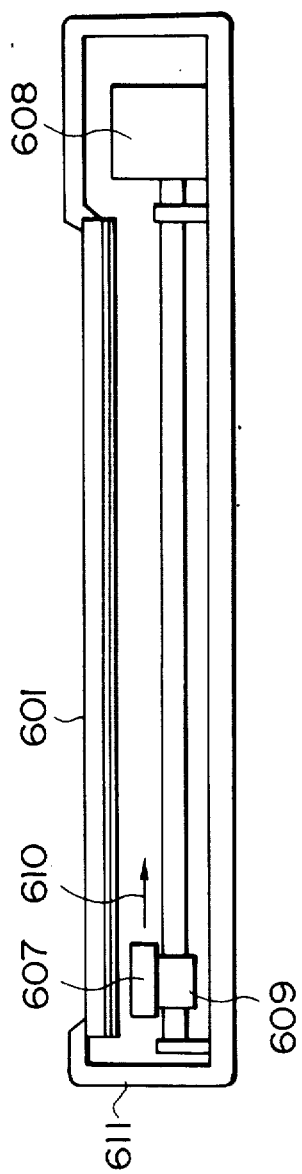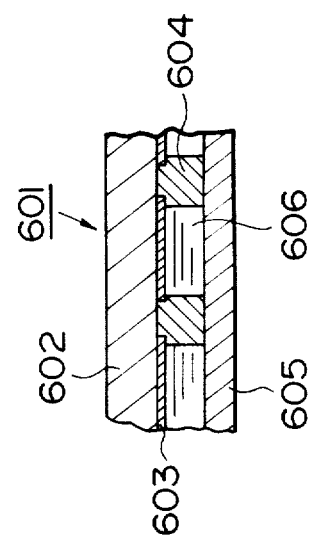
FIG. 6A
FIG. 6B

IMAGE FORMING METHOD AND APPARATUS THEREFOR

BACKGROUND OF THE INVENTION

The present invention relates to a method and an apparatus for image formation and more particularly to a method and an apparatus for image formation using a ferroelectric liquid crystal element or device.

Liquid crystal devices have heretofore been used in the fields of display, optical shutters and the like because they provide apparatus in a small size, in a thin form and with a low power consumption. Especially, in the field of display, there have been a rapid progress based on several noticeable inventions. For example, the application of TN (twisted nematic) liquid crystals have been known, as described in "Voltage-Dependent Optical Activity of a Twisted Nematic Liquid Crystal" by M. Schadt and W. Helfrich, Applied Physics Letters, Vol. 18, No. 4 (Feb. 15, 1971), pp. 127–128. Liquid crystal devices used in the field of display generally have an X-Y matrix electrode structure in order to arrange image display elements (picture elements) in the form of a matrix.

As a method for driving such a display device, there have been generally adopted a time-sharing driving method wherein address signals are sequentially, periodically and selectively applied to scanning electrodes, and predetermined information signals are applied to signal electrodes. However, when the number of picture elements is increased in the display device or the driving method, the duty ratio is decreased, thus resulting in lowering of image contrast and occurrence of cross-talk. Moreover, in order to reduce the size of picture elements and obtain an improved resolution, it is necessary to arrange the matrix electrodes and connect them with lead wires at a high packaging density, whereby manufacture of the devices become complicated.

Another display system is disclosed, e.g., by T. P. Brody, Juris A. Asars and G. Douglas Dixon, IEEE Transactions on Electron Devices, Vol. ED-20, (No. 11, Nov. 1973), pp. 995–1001, "A 6×6 Inch 20 Lines-per-Inch Liquid Crystal Display Panel", wherein respective picture elements are provided with a thin film transistor (TFT) and switched one by one. In this system, however, the provision of TFT to respective picture elements is complicated, and considerable improvement is desired in respect to production cost.

On the other hand, as a system for applying image signals to a liquid crystal device, a heat-scanning system by means of, for example, laser with long wave-lengths has been known, in addition to the one employing a matrix electrode structure. This system employing heat-scanning for applying image signals has an advantage of requiring a much smaller number of lead wires because it does not necessitate the high-density matrix electrode structure. This heat-scanning system for writing image signals in a liquid crystal device is illustrated, for example, in FIG. 1.

In FIG. 1, reference numeral 11 denotes transparent base plates such as glass plates, 12 a transparent electroconductive layer such as of ITO (Indium Tin Oxide), 13 an aluminum reflection film, and 14 an orientation controlling film for controlling orientation of a liquid crystal. Reference numeral 15 denotes a layer of a liquid crystal which causes phasetransition of smectic phase→numatic phase→isotropic phase according as temperature increases. The thickness of the liquid crystal layer 15 is held constant by a spacer 10. Further, liquid crystal molecules constituting the liquid crystal layer 15 are ordinarily uniformly aligned vertically (homeotropically) or horizontally (homogeneously) with respect to the cell face due to wall effect of the orientation controlling film 14.

The operation of the liquid crystal device is explained hereinbelow. At the time of writing images, the liquid crystal layer 15 is held at a smectic side temperature close to the smectic-nematic transition temperature. Then, the liquid crystal layer 15 is irradiated with imagewise laser beam 17A from, e.g., YAG laser and only the irradiated image portion 19 of the liquid crystal layer 15 is transformed into the nematic or isotropic phase. When the irradiation of laser beam is removed, the transformed portion is rapidly cooled and transformed into a light-scattering smectic phase 19. When a readout light flux 17 is irradiated to a cell having such a scattering smectic phase portion 19 from the side of the transparent electrode 14, light beams 17a and 17c are reflected by the aluminum reflection film 13 into an almost constant direction, whereas light beam 17b irradiated to the scattering portion 17 is scattered. Accordingly, when the readout light 17 is projected through the cell onto a screen 16, only light beam 17a and 17c are projected onto the screen but light beam 17b is hardly projected. Thus, the image recorded in the liquid crystal layer is projected as such on the screen 16.

The image recorded in the liquid crystal layer 15 can be erased by applying a voltage to the all from an AC power supply 18 or by heating the whole cell into the nematic or isotropic phase and then gradually cooling the cell. While such a liquid crystal display device can provide a large area of display with a memory characteristic at a high density, it requires a large output laser and a long time for writing one picture of image. Moreover, if the area of the liquid crystal device is increased, the writing time is further increased. Accordingly, the system explained with reference to FIG. 1 can only be applied to a display apparatus of an enlarged projection type.

As another method using no matrix electrode, there is known one using an electron beam for writing. This method is however accompanied with such defects, as in a method using CRT, that a high resolution cannot be obtained because of spreading of the electron beam and that the apparatus requires a large length behind the display face.

SUMMARY OF THE INVENTION

An object of the present invention is to provide a novel image forming method and an apparatus therefor having dissolved the above defects.

Another object of the present invention is to provide a novel image forming method and an apparatus therefor adapted to a display element.

Still another object of the present invention is to provide an image forming method and an apparatus therefor enabling a large area of display at a high packaging density.

According to the present invention, there is provided an image forming method using a device comprising an electroconductive member, an electric charge accepting member and a liquid crystal, particularly a ferroelectric liquid crystal having a first and a second stable states, interposed between the electroconductive member and the electric charge accepting member, said image forming method comprising:

a first step of imparting a uniform polarity of charge to the entirety or a part of the surface of the electric charge accepting member to form an electric field between the electroconductive member and the electric charge accepting member, whereby said ferroelectric liquid crystal is uniformly oriented to its first stable state, and a second step for writing comprising imparting imagewise charge of a polarity opposite to that of the charge imparted in the first step to the electric charge accepting member to form an electric field between the electric charge accepting member and the electroconductive member, whereby the liquid crystal oriented to the first stable state is partially oriented to its second stable state.

BRIEF DESCRIPTION OF THE DRAWINGS

FIGS. 3 and 4 are schematic perspective views illustrating a liquid crystal device and operation principle thereof used in the present invention;

FIG. 5A is a schematic sectional view illustrating an embodiment of the invention;

FIG. 5B is a plan view showing change in orientation of a liquid crystal layer;

FIG. 6A is a sectional view illustrating another embodiment of the present invention; and FIG. 6B is a sectional view of a liquid crystal device used in the embodiment shown in FIG. 6A.

DESCRIPTION OF THE PREFERRED EMBODIMENTS

In the method of the present invention, in addition to the ferroelectric liquid crystal including a bistable smectic liquid crystal, other liquid crystals may be used such as nematic liquid crystals having a positive or negative dielectric anisotropy. However, the present invention will be explained hereinbelow mainly with reference to a bistable smectic liquid crystal and a smectic liquid crystal while referring to the accompanying drawings.

Figure 1:
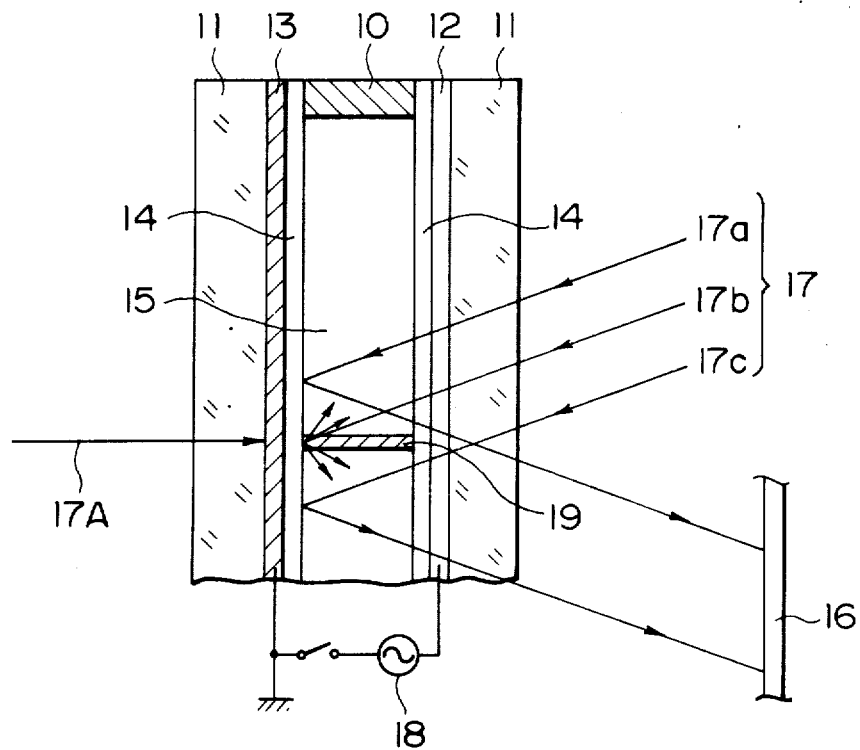
FIG. 1 is a sectional view of an image forming apparatus of the prior art.
Figure 2:
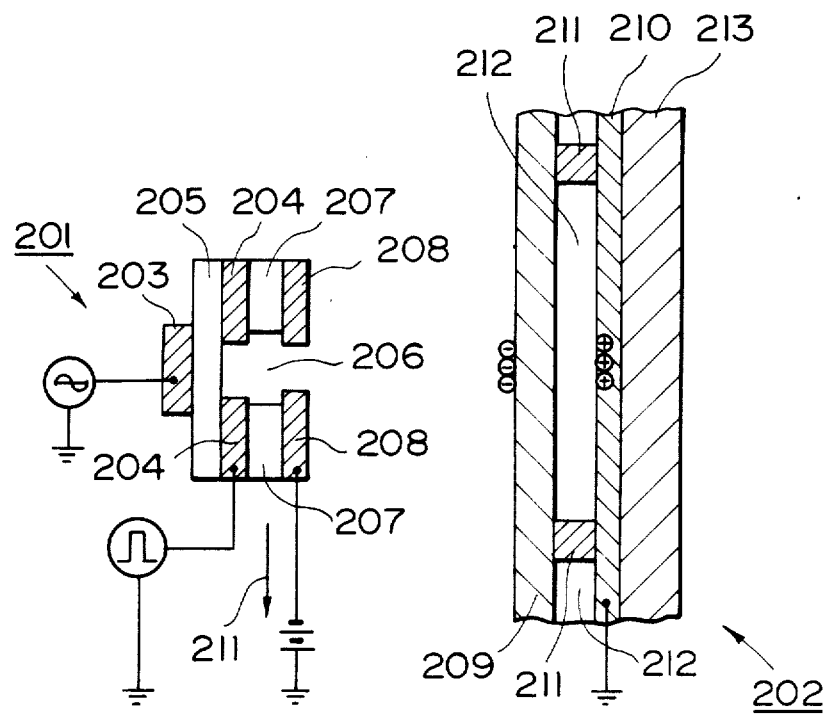
FIG. 2 is a schematic sectional view illustrating the present invention.

FIG. 2 is a sectional view schematically illustrating an embodiment of the apparatus for practicing the method of the invention. More specifically, FIG. 2 shows an example of the image forming apparatus comprising an ion generator 201 as a writing means and a liquid crystal device 202 as a means to be written-in. The ion generator 201 may be one disclosed in, for example, Japanese Patent Laid-Open Application No. 78134/1979, U.S. Pat. Nos. 4,195,927, 4,267,556 and 4,160,257, Canadian Pat. No. 1120992 and Japanese Patent Publication No. 35874/1981.

The ion generator 201 is operated by applying a high AC voltage to an electrode 203 and causing gaseous discharge because of an electric field generated between the electrode 203 and an electrode 204, whereby an insulating layer 205 is charged and discharged. Thus, by charging and discharging the insulating layer 205, a source of positive or negative ions is formed at an aperture 206 of the electrode 204. An electrode 208 for extracting ions is provided on the electrode 204 through an insulating member 207 for giving a predetermined gap.

A DC voltage is applied between the electrode 208 and an electrode 210 serving as counter electrode of the ion generator 201 and formed on a base plate 214 such as of glass, plastic, etc. of the liquid crystal device 202, ions are emitted from the aperture 206 toward an electric charge accepting member 209. In this instance, by selecting the direction of the electric field between the electrodes 204 and 208, either positive or negative ions are selectively directed toward the electrode 208. Between the electrodes 208 and 210, only either positive or negative ions are emitted toward the electrode 210 because of the DC electric field. Accordingly, by applying a signal voltage to the electrode 204 corresponding to a digital image signal, ions are irradiated imagewise onto the charge accepting member 209 and a charged image is formed thereon.

In the ion generator 201, one picture element may be formed by one aperture 206. Accordingly, if a large number of apertures 206 are arranged in the thickness direction of the drawing to form an aperture array and the aperture array is moved in the direction of an arrow 211, imagewise charges are imparted onto the entire surface of the liquid crystal device facing the ion charger 201 of the liquid crystal device 202. Formation of imagewise charges on the liquid crystal device can also be effected by using an ion charger having apertures arranged in matrix and in parallel with the liquid crystal device. In this case, however, a large number of apertures are required corresponding to the required number of picture elements on the liquid crystal device and increased number of driving elements are required correspondingly. In contrast thereto, when the ion generator having apertures disposed in array shown in FIG. 2 is used, the number of apertures is remarkably reduced. Moreover by adopting a matrix driving scheme between the AC voltage applied to the electrode 203 and the image signal voltage applied to the electrode 204, the number of driving elements is remarkably reduced.

The charge accepting member 209 may be formed of a film or thin plate of a plastic such as polyimide and polyamide or an inorganic insulating material such as mica and glass. Because of electrostatic charges (e.g., negative ones as shown in the figure with ⊖) formed on the charge accepting member 209 and charges induced thereby in the electrode 210 (e.g., positive ones as shown in the figure with ⊕), an electric field is applied to the liquid crystal layer 212, whereby the orientation direction of the liquid crystal is changed.

Between the liquid crystal layer 212 and the charge accepting member 209 or between the liquid crystal layer 212 and the transparent electrode 210 may be formed an orientation controlling film which may be a film of an inorganic material such as SiO, $SiO_2$ and $TiO_2$ or a film of an organic compound such as polyimide, polyamide, polyvinyl alcohol and polyester and may also function as an insulating film when it is formed on the transparent electrode 210.

The liquid crystal to be used herein may suitably be a field-effect type liquid crystal such as a nematic liquid crystal, a cholesteric liquid crystal, a smectic liquid crystal and further a ferroelectric liquid crystal including a chiral smectic liquid crystal.

The intensity of the electric field for causing the orientation may vary depending on the kind of the liquid crystal used but may be of the order or $0.5$–$10 \times 10^6$ V/m which corresponds to the order of $1.5$–$44 \times 10^{-5}$ coulomb/$m^2$ in terms of electric charges to be imparted while it varies depending on the dielectric constants of the liquid crystal layer 212 and the charge accepting member 209.

The thickness of the charge accepting member 209 does not remarkably influence the voltage distributed and applied to the liquid crystal layer 212 but may preferably be equal to or less than the diameter or size of the aperture 206 particularly one half or less of the diameter because a large thickness can result in a poorer resolution due to spreading of the electric field. More precisely, the thickness is desirably of the order of 30 microns or less where one picture element measures, for example, 60 microns in size. Because an electrostatic attraction operates between the charge accepting member 209 and the electrode 210, it is desirable to dispose spacers in, e.g., stripe shape at a sufficient density to prevent deformation of the charge accepting member.

The portion of the spacer 213 is made black or in a light scattering state, depending on the display system adopted, so as not to result in a bad influence on the image display contrast. When the ratio between the pitch of the spacers 213 and the pitch of the picture elements is close to an integer, a moiré phenomenon (interference pattern) can occur. The phenomenon can be obviated by selecting appropriate pitch or angle of arrangement of the spacers 213 or arranging the spacers 213 at random.

The resistance of the charge accepting member 209 can be low as low as down to $10^{10}$ Ω·cm, i.e., can be $10^{10}$ Ω·cm or higher, when a liquid crystal having a memory characteristic such as a bistable smectic liquid crystal is used, because, in such a case, the charge accepting member is required to hold charges thereon during a time period only required for changing the orientation of the liquid crystal. In this case, it is preferred that the charge accepting member is grounded or connected to a lower potential so that charges are not accumulated in the charge accepting member.

When images are rewritten, the images may be erased according to various methods depending on the liquid crystal used. For example, the image written in the above described manner can be erased by applying a uniform electric field over the whole extension of the liquid crystal device. For this purpose, a separate corona discharger for generating corona can be used to remove the charges or impart charges of a polarity opposite to that of the charges used for writing, or the ion generator 201 can be used to apply erasure signals imagewise instead of the image signals used in the writing in such a manner that an ion beam of a polarity opposite to that of the ion beam used at the time of writing is used. Further, the written image can also be erased by irradiating the entirety or a part of the charge accepting member uniformly with an ion beam of a polarity opposite to that of the ion beam used during writing. At the erased portion, an image can be formed again by irradiating imagewise an ion beam for writing in substantially the same manner as explained above.

In the case where the orientation of a liquid crystal is changed by a certain amount of charge imparted from outside in a manner as described above, a ferroelectric liquid crystal is optimally used as the liquid crystal since it has a high impedance or resistivity of $10^{10}$ Ω·cm or above and can effectively prevent the leakage of charge. Such a ferroelectric liquid crystal includes chiral smectic liquid crystals, of which chiral smectic C-phase (SmC*), H-phase (SmH*), I-phase (SmI*), J-phase (SmJ*), K-phase (SmK*), G-phase (SmG*) or F-phase (SmF*) liquid crystal is suited. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals"; "Solid State Physics" 16 (141), 1981 "Liquid Crystal", etc. Ferroelectric liquid crystals disclosed in these publications may be used in the present invention.

Specific examples of the ferroelectric liquid crystal compounds are decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresocylidene-4'-octylaniline (MBRA8), etc.

When a liquid crystal device is constituted using these materials, the device may be supported with a block of copper, etc. in which a heater is embedded in order to realize a temperature condition where the liquid crystal compounds assume an SmC*-, SmH*-, SmI*-, SmJ*-, SmK*-, SmG*- or SmF*-phase.

Referring to FIG. 3, there is schematically shown an example of a ferroelectric liquid crystal cell. Herein, for the simplicity of illustration, a charge accepting member having charge thereon is depicted as an electrode structure.

Between an electrode 31 (e.g., corresponding to the combination of a charge accepting member and charge thereon) and an electrode 31a is inserted a liquid crystal in the phase of, e.g., SmC* or SmH* oriented in such a manner that the liquid crystal molecule layer 32 is perpendicular to the surfaces of the electrodes.

A full line 33 (shows liquid crystal molecules. Each liquid crystal molecule 33 has a dipole moment (P⊥) 34 in a direction perpendicular to the axis thereof. When a voltage higher than a certain threshold level is applied between electrodes 31 and 31a, a helical structure of the liquid crystal molecule 33 is loosened or unwound to change the alignment direction of respective liquid crystal molecules 33 so that the dipole moments (P⊥) 34 are all directed in the direction of the electric field. The liquid crystal molecules 33 have an elongated shape and show refractive anisotropy between the long axis and the short axis thereof. Accordingly, it is easily understood that when, for instance, polarizers arranged in a cross nicol relationship, i.e., with their polarizing directions being crossing each other are disposed on the upper and the lower sides of the electrodes, the liquid crystal cell thus arranged functions as a liquid crystal optical modulation device of which optical characteristics vary depending upon the polarity of an applied voltage.

The liquid crystal cell structure preferably used in the liquid crystal device 201 can be made sufficiently thin (e.g., 10μ or below). As the liquid crystal layer becomes thinner in this manner, helical structure of the liquid crystal molecules is loosened or unwound without application of an electric field whereby the dipole moment assumes either one of the two states, i.e., P in an upper direction 44 or Pa in a lower direction 44a as shown in FIG. 4. When electric field E or Ea higher than a certain threshold level and different from each other in polarity as shown in FIG. 4 is applied to a cell having the above-mentioned characteristics through voltage application means 41 and 41a, the dipole moment is directed either in the upper direction 44 or in the lower direction 44a depending on the vector of the electric field E or Ea. In correspondence with this, the liquid crystal molecules are oriented in either one of a first stable state 43 and a second stable state 43a.

When the above-mentioned ferroelectric liquid crystal is used as an optical modulation element, it is possible to obtain two advantages as briefly mentioned before. First is that the response speed is quite fast. Second is that the orientation of the liquid crystal shows bistability. The second advantage will be further explained, e.g., with reference to FIG. 4. When the electric field E is applied to the liquid crystal molecules, they are oriented in the first stable state 43. This state is kept stable even if the electric field is removed. On the other hand, when the electric field Ea of which direction is opposite to that of the electric field E is applied thereto, the liquid crystal molecules are oriented in the second stable state 43a, whereby the directions of molecules are changed. Likewise, the latter state is kept stable even if the electric field is removed. Further, as long as the magnitude of the electric field E being applied is not above a certain threshold value, the liquid crystal molecules are placed in the respective orientation states. In order to effectively realize such high response speed and bistability, it is preferred that the thickness of the cell is as thin as possible and generally 0.5 to 20μ, particularly 1 to 5μ. A liquid crystal device having a matrix electrode structure in which the ferroelectric liquid crystal of this kind is used is proposed, e.g., in the specification of U.S. Pat. No. 4,367,924 by Clark and Lagerwall.

FIG. 5A illustrates an example wherein an embodiment of the image forming apparatus is applied to display.

The liquid crystal device shown in FIG. 5A is one of a reflection type, wherein a dielectric mirror is disposed. The dielectric mirror 502 generally has a high reflectivity for visible light and comprises a multi-layer film with layers of $Ge/MgF_2$ $(\frac{1}{4}\lambda)/CeO_2(\frac{1}{4}\lambda)/MgF_2(\frac{1}{4}\lambda)/CeO_2(\frac{1}{4}\lambda)$. Further, in this example, a polarization beam splitter 503 is used in order to taking out an optical modulation occurring between the first and stable states.

The liquid crystal device 501 has a cell structure comprising a charge accepting member 504 provided with the dielectric mirror 502, a substrate 506 such as a glass plate on which a transparent electrode 505, e.g., of ITO (indium-TiO-Oxide), and a liquid crystal layer 507 sandwiched between the charge accepting member and the substrate. The gap in the cell is held by a spacer 508.

Prior to image formation, the whole surface of the charge accepting member is irradiated with a negative ion beam from an ion generator 509 to be given an uniform negative charge, by which a voltage Eaa is applied to the liquid crystal layer 507. If the voltage Eaa thus given is larger than the threshold voltage of the liquid crystal, the liquid crystal is oriented to its first stable state as shown by reference numeral 510 in FIG. 5B.

Subsequently, a positive ion beam is irradiated imagewise from the ion generator 509 to the charge accepting member 504. In this instance, either the ion generator 509 or the liquid crystal device is moved relative to the other, whereby the ion beam can be scanned in the direction of an arrow 514 onto the charge accepting member 504. By the irradiation of the ion beam, positive charges (shown by ⊕ in FIG. 5B) are formed imagewise on the charge accepting member and an electric field Ea opposite to Eaa is applied to the liquid crystal layer 507. If the voltage Ea exceeds the threshold voltage, a portion of the liquid crystal oriented to the first stable state 510 is re-oriented to the second stable state 511. The charge imparted to the charge accepting member 504 gradually leak to be extinguished and the voltage applied to the liquid crystal layer 507 is extinguished. In this example, however, the recorded image is retained because the ferroelectric liquid crystal 507 has a memory characteristic.

In order to display the recorded image, projecting light beams 512a, 512b and 512c are irradiated through a polarization beam splitter 503 to the liquid crystal device 501, whereby the image recorded in the liquid crystal layer 507 is projected onto a projection screen 513. In this example, the polarization direct tion of the polarization beam splitter 503 is made parallel or perpendicular to the direction of alignment 510 of the liquid crystal, and projection light beams 512a, 512b and 512c are referred to as polarized beams of P component. The light beams 512a, 512b and 512c are irradiated through the polarization beam splitter to the liquid crystal device 501 as they are polarized beams of P component. Among the polarized beams of P component, beams 512a and 512c are transmitted through portions 510 of the liquid crystal oriented to the first stable state, reflected by the dielectric mirror 502 and transmitted again through the polarization beam splitter 503 as they are polarized beams of P component.

On the contrary, among the polarized beams of P component, projection beam 512b is transmitted through the portion 511 of the liquid crystal oriented to the second stable state, reflected by the dielectric mirror, and modulated into a polarized light beam containing S component, of which only the S component of the polarized beam is reflected by the polarization beam splitter 503 to be a beam 512bb which is then projected onto the projection 513, whereby the image recorded in the liquid crystal device is projected onto the projection screen 513.

In another embodiment of the invention, a smectic phase liquid crystal is used. The liquid crystal in the smectic phase is first heated to an isotropic phase and then rapidly cooled by heat radiation in the presence of an electric field given by an ion generator, whereby the portion of the liquid crystal placed in the electric field is transformed into a transparent smectic phase while the portion of the liquid crystal in the absence of the electric field is transformed into a smectic phase in a light scattering state. A liquid crystal device shown in FIGS. 6A and 6B comprises a cell structure which, in turn, comprises a transparent substrate 602 such as a glass plate, a transparent electrode 603 disposed thereon in the form of stripes, a spacer 604 and a charge accepting member 605, and a liquid crystal layer 606 disposed in the cell. In this instance, the charge accepting member 605 is preferably colored in white or in another color. The ion generator 607 is supported on a ball-nut 609, which is driven by a motor 608, and moved reciprocally in the direction of an arrow 610. The transparent electrode 603 in the form of stripes functions as a counter electrode for the ion generator 607 successively generating ion beams. The heating of the liquid crystal layer 606 is effected by passing a current through the transparent electrode 603 in phase with the movement of the ion generator 607, more particularly, just prior to or substantially simultaneously with imagewise exposure with ion beams of the charge accepting member 605. As the heating means, an infrared heater may be used, instead of the stripe-form electrode, for scanning in combination with the ion generator.

In order to erase the written image, the smectic liquid crystal is heated to its isotropic phase and cooled by heat emission in the presence of an electric field, whereby a transparent smectic phase is again formed. The electric field may be formed by a pair of electrodes sandwiching the liquid crystal layer but is preferably formed by charges given by ion beam irradiation in the present invention. The thus erased portions of the liquid crystal may be again subjected to a writing process comprising heating into the isotropic phase and ion beam irradiation under cooling.

The smectic liquid crystal to be used herein may preferably be those causing phase-transition through smectic, nematic and isotropic phases.

A ferroelectric liquid crystal may also be used in the apparatus shown in FIGS. 6A and 6B with some modification. In this case, the electrode (603) need not be in the form of stripes, but an electrode film as denoted by reference numeral 210 in FIG. 2 may be used as a counter electrode for the ion generator 607. Instead, the liquid crystal device 601 should be sandwiched between a pair of polarizers (arranged in a cross nicol relationship). One of the polarizers is applied on the outer side of the substrate 602 or disposed in the proximity thereof. The charge accepting member 605 may be formed of a polarizer which can be used as the other one of the above mentioned pair of polarizers. Otherwise, the other polarizer is preferably disposed outside the ion generator 607 so as not to obstruct the movement thereof.

In the above mentioned example, an active gas generated by electric discharge from the ion generator 607 can invite corrosion of electrodes used in the ion generator or deterioration of the insulating material or the charge accepting member, whereby the service life of the image forming apparatus can be shot. In order to obviate these difficulties, it is preferred to adopt a deterioration prevention means such as replacement of the interior space of the container 611 shown in FIG. 6A with an inert gas such as neon and argon. Reduction in pressure of the interior space is effective not only for promoting the electrical discharge but also for preventing the deterioration of the relating materials as mentioned above.

As explained hereinabove, by using an apparatus wherein a liquid crystal device provided with an electric charge accepting member is scanned with ion beams for writing, the necessity of fine electrode wiring is reduced and the number of driving elements is decreased, whereby fine image display is realized with a small size of apparatus.

What is claimed is:

1. An image forming apparatus comprising:
   a device which comprises an electroconductive member, an electric charge accepting member, and a liquid crystal interposed between the electroconductive member and the electric charge accepting member, and
   an ion generator for imparting an electric charge to the electric charge accepting member sufficient to form an electric field exceeding the threshold voltage of the liquid crystal between the electric charge accepting member and the electroconductive member.

2. The image forming apparatus according to claim 1, wherein said ion generator is capable of generating ion beams.

3. The image forming apparatus according to claim 2, wherein said liquid crystal is sealed in a cell structure comprising said electroconductive member and said electric charge accepting member, and the electroconductive member forms a counter electrode with respect to said ion generator.

4. The image forming apparatus according to claim 2, wherein said ion generator comprises a plurality of apertures for generating ion beams arranged in array.

5. The image forming apparatus according to claim 1, which further comprises means for moving said ion generator relative to said electric charge receiving member.

6. The image forming apparatus according to claim 1, wherein said electroconductive member is a transparent electroconductive film supported on a transparent substrate.

7. The image forming apparatus according to claim 1, wherein an orientation controlling film is provided on the side of the electroconductive member contacting the liquid crystal.

8. The image forming apparatus according to claim 1, wherein said charge accepting member comprises an organic or inorganic insulating material.

9. The image forming apparatus according to claim 1, wherein the electric field applied to the liquid crystal has an intensity ranging from $0.5 \times 10^6$ V/m to $10 \times 10^6$ V/m.

10. The image forming apparatus according to claim 1, wherein the electric charge imparted by said charging means ranges from $1.5 \times 10^{-5}$ coulomb/m$^2$ to $44 \times 10^{-5}$ coulomb/m$^2$.

11. The image forming apparatus according to claim 2, wherein said ion generator has an aperture for generating ion beams having a diameter equal to or larger than the thickness of the electric charge accepting member.

12. The image forming apparatus according to claim 11, wherein the thickness of the electric charge accepting member is one half or less of the aperture diameter of the ion generator.

13. The image forming apparatus according to claim 1, wherein said electric charge accepting member has a resistivity of $10^{10}$ ohm-cm or above.

14. The image forming apparatus according to claim 13, wherein said writing means comprises a plurality of apertures for generating ion beams arranged in array.

15. The image forming apparatus according to claim 1, wherein said liquid crystal is a ferroelectric liquid crystal.

16. The image forming apparatus according to claim 15, wherein said ferroelectric liquid crystal is a chiral smectic liquid crystal.

17. The image forming apparatus according to claim 15, wherein said ferroelectric liquid crystal is a bistable chiral smectic liquid crystal.

18. An image forming apparatus comprising:
   a device which comprises an electroconductive member, an electric charge accepting member, and a ferroelectric liquid crystal layer interposed between the electroconductive member and the electric charge accepting member, said device being capable of modulating a light transmitted therethrough, charging means for imparting an electric charge to the electric charge accepting member sufficient to form an electric field exceeding the threshold voltage of the liquid crystal between the electric charge accepting member and the electroconductive member, and polarizing means for detecting the modulated light transmitted through the ferroelectric liquid crystal layer.

19. The image forming apparatus according to claim 18, wherein said light to be transmitted through said layer of ferroelectric liquid crystal is light polarized through polarizing means.

20. The image forming apparatus according to claim 18, which further comprises reflecting means for reflecting the modulated polarized light which has been transmitted through the ferroelectric liquid crystal layer, and a polarization beam splitter for detecting the modulated component of the modulated polarized light which has been reflected by the reflecting means.

21. The image forming apparatus according to claim 20, which further comprises a projecting screen on which the modulated component of the polarized light detected by the polarization beam splitter is projected.

22. The image forming apparatus according to claim 20, wherein said reflecting means is a dielectric mirror.

23. The image forming apparatus according to claim 18, wherein said ferroelectric liquid crystal is a bistable smectic liquid crystal.

24. The image forming apparatus according to claim 23, wherein said bistable liquid crystal is a chiral smectic liquid crystal.

25. The image forming apparatus according to claim 24, wherein said chiral smectic liquid crystal has a nonspiral structure.

26. The image forming apparatus according to claim 24, wherein said chiral smectic liquid crystal is C-phase or H-phase.

27. An image forming apparatus comprising:
a device which comprises an electroconductive member, an electric charge accepting member, and a ferroelectric liquid crystal layer interposed between the electroconductive member and the electric charge accepting member, charging means for imparting an electric charge to the electric charge accepting member sufficient to form an electric field exceeding the threshold voltage of the liquid crystal between the electric charge accepting member and the electroconductive member, and a pair of polarizing means disposed outside the ferroelectric liquid crystal layer.

28. The image forming apparatus according to claim 27, wherein said pair of polarizing means are disposed in a cross nicol relationship.

29. The image forming apparatus according to claim 27, wherein one of said pair of polarizing means is also used as said electric charge accepting means.

30. The image forming apparatus according to claim 28, wherein one of said pair of polarizing means is disposed outside said charging means with respect to said liquid crystal.

31. The image forming apparatus according to claim 27, wherein said ferroelectric liquid crystal is a chiral smectic liquid crystal.

32. An image forming apparatus comprising:
a liquid crystal device of a cell structure comprising an electroconductive member, an electric charge accepting member, and a layer of ferroelectric liquid crystal interposed between the electroconductive member and the electric charge accepting member, polarizing means for detecting modulated light which has been transmitted through the ferroelectric liquid crystal layer and optically modulated thereby, writing means for generating ion beams with said electroconductive member as a counter electrode and scanning the ion beams onto the electric charge accepting member to write an image in the liquid crystal layer, and erasing means for erasing the written image.

33. The image forming apparatus according to claim 32, wherein said erasing means comprises means for generating ion beams.

34. The image forming apparatus according to claim 33, wherein said erasing means generates ion beams with a polarity opposite to that of the ion beams generated from said writing means.

35. The image forming apparatus according to claim 32, wherein said erasing means comprises a corona discharger.

36. The image forming apparatus according to claim 32, wherein a pair of polarizing means are further provided outside the ferroelectric liquid crystal layer.

37. The image forming apparatus according to claim 36, wherein said pair of polarizing means are disposed in a cross nicol relationship.

38. The image forming apparatus according to claim 32, wherein said ferroelectric liquid crystal is a bistable smectic liquid crystal.

39. The image forming apparatus according to claim 38, wherein said bistable liquid crystal is a chiral smectic liquid crystal.

40. The image forming apparatus according to claim 39, wherein said chiral smectic liquid crystal has a nonspiral structure.

41. The image forming apparatus according to claim 39, wherein said chiral smectic liquid crystal is in C-phase or H-phase.

42. The image forming apparatus according to claim 32, which further comprises means for preventing deterioration of the liquid crystal device due to ion beam irradiation.

43. The image forming apparatus according to claim 32, which further comprises means for preventing deterioration of the writing means due to ion beam generator.

44. An image forming apparatus comprising:
a device which comprises an electroconductive member, an electric charge accepting member, and a smectic liquid crystal interposed between the electroconductive member and the electric charge accepting member, heating means for heating the smectic liquid crystal into its isotropic phase, and an ion generator for generating ion beams with said electroconductive member as a counter electrode and irradiating the ion beams onto the electric charge accepting member.

45. The image forming apparatus according to claim 44, wherein said smectic liquid crystal is sealed in a cell structure comprising said electroconductive member and said electric charge accepting member.

46. The image forming apparatus according to claim 44, wherein said smectic liquid crystal causes phase-transition through smectic phase, nematic phase and isotropic phase.

47. The image forming apparatus according to claim 45, wherein said electroconductive member is a transparent electroconductive film disposed in a stripe form on a transparent substrate, said stripe form transparent electroconductive film forming a counter electrode for successively generating ion beams and having a function of generating heat by electrical conduction therethrough, said electrical conduction being effected substantially simultaneously with or just prior to the ion beam irradiation.

48. The image forming apparatus according to claim 44, wherein said ion generator comprises a plurality of apertures for generating ion beams disposed in array.

49. An image forming method using a device comprising an electroconductive member, an electric charge accepting member and a ferroelectric liquid crystal having a first and a second stable state interposed between the electroconductive member and the electric charge accepting member, said image forming method comprising:
- a first step of imparting a uniform polarity of charge to the entirety or a part of the electric charge accepting member to form an electic field between the electroconductive member and the electric charge accepting member, whereby said ferroelectric liquid crystal is unformly oriented to its first stable state,
- a second step for image-writing comprising imparting imagewise charge of a polarity opposite to that of the charge imparted in the first step to the electric charge accepting member to form an electric field between the electric charge accepting member and the electroconductive member, whereby the liquid crystal oriented to the first stable state is partially oriented to its second stable state,
- a step of irradiating the ferroelectric liquid crystal oriented imagewise to its first and second stable states with polarized light having one polarization component to cause modulation of the polarized light, and a step of detecting the modulation to form an image.

50. The image forming method according to claim 49, wherein said ferroelectric liquid crystal is a bistable chiral smectic liquid crystal.

51. The image forming method according to claim 49, wherein said bistable liquid crystal is a chiral smectic liquid crystal.

52. The image forming method according to claim 50, wherein said chiral smectic liquid crystal has a non-spiral structure.

53. The image forming method according to claim 51, wherein said chiral smectic liquid crystal is in C-phase or H-phase.

54. The image forming method according to claim 49, wherein said polarized light having one polarization component and having passed through a polarization beam splitter is transmitted and reflected through a layer of the liquid crystal to cause the modulation, and the thus modulated light having the other polarization component is detected by the polarization beam splitter.

55. The image forming method according to claim 49, wherein a pair of polarizers are disposed outside a layer of the ferroelectric liquid crystal, polarized light having passed through one of said pair of polarizers is transmitted through the ferroelectric liquid crystal layer to be optically modulated, and the thus modulated polarized light is detected by the other polarizing means.

56. The image forming method according to claim 55, wherein said pair of polarizers are disposed in a cross nicol relationship.

57. The image forming method according to claim 49, wherein said electroconductive member is a transparent electrode film supported on a transparent substrate, which forms a cell structure in combination with the electric charge accepting member.

58. The image forming method according to claim 49, which comprises:
- a first step of irradiating a uniform polarity of ion beams to the entirety or a part of the electric charge accepting member to form an electric field between the electroconductive member and the electric charge accepting member, whereby said ferroelectric liquid crystal is uniformly oriented to its first stable state,
- a second step for image-writing comprising irradiating imagewise ion beams of a polarity opposite to that of the ion beams irradiated in the first step to the electric charge accepting member to form an electric field between the electroconductive member and the electric charge accepting member, whereby the liquid crystal oriented to the first stable state is partially oriented to its second stable state and an image is written, and
- a third step for image-erasure comprising irradiating a uniform polarity of ion beams to the entirety or a part of the electric charge accepting member to form an electric field between the electroconductive member and the electric charge accepting member, whereby said ferroelectric liquid crystal is uniformly oriented to one of said first and second stable states corresponding to the electric field and the image written in the second step is erased.

59. The image forming method according to claim 58, wherein said ion beams used in the third step have the same polarity as that of the ion beams used in the first step.

60. The image forming method according to claim 58, which further comprises a fourth step for re-writing comprising irradiating imagewise ion beams to the whole or a part of the portion irradiated in the third step of the electric charge accepting member, whereby an image is re-written in the corresponding part of the liquid crystal layer.

61. The image forming method according to claim 60, wherein the ion beams used in the fourth step has the same polarity as that of the ion beams used in the second step.

62. An image forming method using a device comprising an electroconductive member, an electric charge accepting member and a smectic liquid crystal interposed between the electroconductive member and the electric charge accepting method, said image forming method comprising:
- a first step of heating the smectic liquid crystal into its isotropic phase, and
- a second step of irradiating imagewise ion beams with said electroconductive member as a counter electrode to said electric charge accepting member under cooling, whereby said smectic liquid crystal is caused to form a transparent smectic phase at parts corresponding to the irradiated parts of the electric charge accepting member and to form a light-scattering smectic phase at parts corresponding to the nonirradiated parts of the electric charge accepting member, thereby writing an image.

63. The image forming method according to claim 62, wherein said smectic liquid crystal causes phase-transition through smectic phase, nematic phase and isotropic phase.

64. The image forming method according to claim 62, which comprises:
- a first step of heating the smectic liquid crystal into its isotropic phase, and
- a second step of irradiating imagewise ion beams with said electroconductive member as a counter electrode to said electric charge accepting member under cooling, whereby said smectic liquid crystal is caused to form a transparent smectic phase at parts corresponding to the irradiated parts of the electric charge accepting member and to form a light-scattering smectic phase at parts corresponding to the nonirradiated parts of the electric charge accepting member, thereby writing an image, and
- a third step of heating the smectic liquid crystal into the isotropic phase and irradiating uniformly ion beams with the electroconductive member as a counter electrode to the entirety or a part of the electric charge accepting member under cooling to form a transparent smectic phase of the liquid crystal at parts corresponding to the irradiated parts of the electric charge accepting member, thereby erasing the image written in the second step.

65. The image forming method according to claim 64, wherein said first and second steps are repeated after said third step to write another image.

66. The image forming method according to claim 62, wherein said electroconductive member is a transparent electroconductive film supported on a transparent substrate, which forms a cell structure in combination with the electric charge accepting member.

67. An image forming method using a device comprising an electroconductive member, an electric charge accepting member and a ferroelectric liquid crystal having a first and a second stable state interposed between the electroconductive member and the electric charge accepting member, said image forming method comprising:
- a first step of imparting a uniform polarity of charge to the entirety or a part of the electric charge accepting member to form an electric field between the electroconductive member and the electric charge accepting member, whereby said ferroelectric liquid crystal is uniformly oriented to its first stable state, and
- a second steP for image-writing comprising imparting imagewise charge of a polarity opposite to that of the charge imparted in the first step to the electric charge accepting member to form an electric field between the electric charge accepting member and the electroconductive member, whereby the liquid crystal oriented to the first stable state is partially oriented to its second stable state;
- the electric charges in the first and second steps being imparted to the electric charge accepting member by irradiation of ion beams.

68. The image forming method according to claim 67, wherein said ion beams are scanned over the electric charge accepting member.

* * * * *

UNITED STATES PATENT AND TRADEMARK OFFICE
CERTIFICATE OF CORRECTION

PATENT NO. : 4,692,779

DATED : September 8, 1987

INVENTOR(S) : YUJIRO ANDO, ET AL.

It is certified that error appears in the above-identified patent and that said Letters Patent is hereby corrected as shown below:

IN THE DRAWINGS

Sheet 2, Figure 2, change reference numeral "213" to --214-- and change reference numeral "211" to --213--.

COLUMN 1

Line 38, "become" should read --becomes--.
Line 68, "numatic" should read "nematic--.

COLUMN 2

Line 26, "beam" should read --beams--.
Line 31, "the all" should read --the cell--.

COLUMN 6

Line 32, "(shows" should read --shows--.
Line 46, delete "being".

COLUMN 7

Line 40, "taking" should read --take--.

COLUMN 8

Line 3, "charge" (first occurrence) should read --charges--.
Line 14, "direct tion" should read --direction--.
Line 36, "projection 513," should read --projection screen 513,--

UNITED STATES PATENT AND TRADEMARK OFFICE
CERTIFICATE OF CORRECTION

PATENT NO. : 4,692,779
DATED : September 8, 1987
INVENTOR(S) : YUJIRO ANDO, ET AL.

It is certified that error appears in the above-identified patent and that said Letters Patent is hereby corrected as shown below:

COLUMN 9

Line 39, "shot." should read --short--.
Line 46, "relating" should read --related--.

COLUMN 13

Line 23, "electic" should read --electric--.

COLUMN 14

Line 48, "has" should read --have--.
Line 55, "method," should read --member,".

Signed and Sealed this

Twenty-first Day of June, 1988

Attest:

DONALD J. QUIGG

Attesting Officer

Commissioner of Patents and Trademarks